Jan. 29, 1935. L. B. NICHOLS 1,989,625
APPARATUS FOR DETERMINING TEARING STRENGTH
Filed Feb. 7, 1931 3 Sheets-Sheet 1

INVENTOR
LORREL B. NICHOLS
by Roberts, Cushman & Woodberry
ATTYS

Jan. 29, 1935.   L. B. NICHOLS   1,989,625
APPARATUS FOR DETERMINING TEARING STRENGTH
Filed Feb. 7, 1931   3 Sheets-Sheet 3
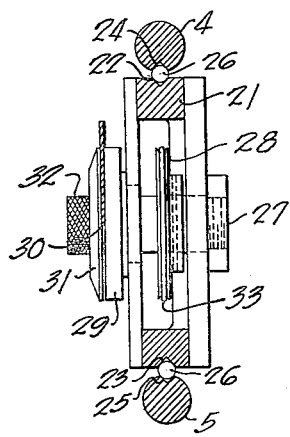
Fig. 6
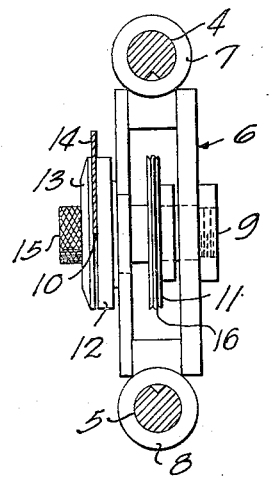
Fig. 5
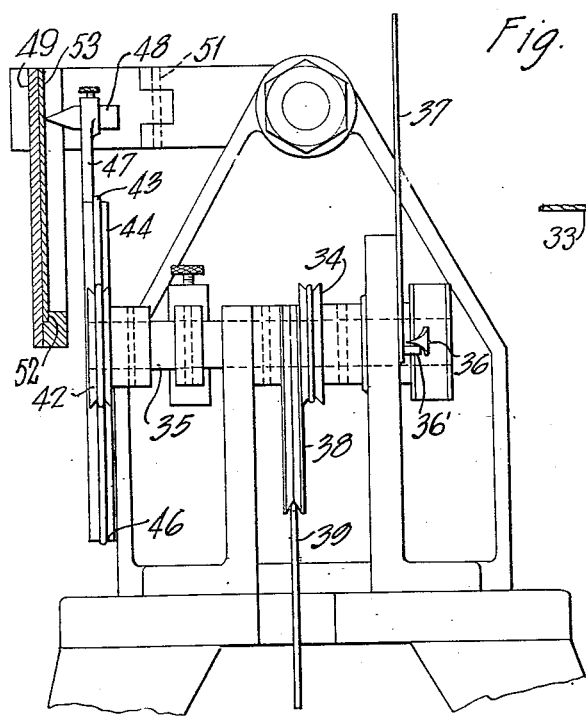
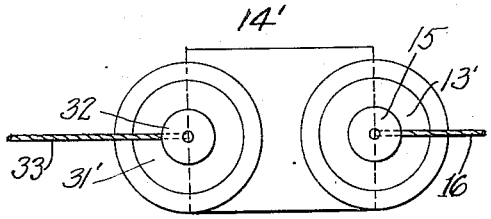
Fig. 7   Fig. 8
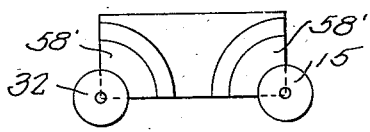
Fig. 9.
INVENTOR
LORREL B. NICHOLS
by Roberts, Cushman & Woodberry
ATT'YS Patented Jan. 29, 1935

1,989,625

UNITED STATES PATENT OFFICE 1,989,625

APPARATUS FOR DETERMINING TEARING STRENGTH

Lorrel B. Nichols, East Walpole, Mass., assignor of one-half to Hollingsworth & Vose Company, Boston, Mass., a corporation of Massachusetts Application February 7, 1931, Serial No. 514,223

11 Claims. (Cl. 265—17)

The present invention relates to an apparatus for testing the tearing strength of paper and like sheet materials.

In the procedures heretofore employed for testing the strength of paper it has been common practice to select a strip of the paper to be tested, cut the same to standard dimensions, make an incision of predetermined depth in one side of the same and then to measure the force required to tear the strip from the bottom of this incision to the opposite edge. One way of thus measuring the strength is to let a swinging pendulum tear the sheet and then note the decrease in the swing of the pendulum from the amount of its normal free swing, which is a measure of the resistance of the paper to tearing.

Another method of testing the strength of paper is by subjecting a strip of paper of uniform cross section to increasing load longitudinally of the strip and noting the load at which the strip is ruptured. This measures the aggregate tensile strength of the paper strip.

But none of the methods or apparatus heretofore employed has measured the initial tearing strength of a sheet of paper,—i. e., the force required to commence the tearing of a free edge.

It is accordingly an object of the present invention to provide an apparatus for testing and measuring the initial tear strength or resistance to tear which is presented by the free edge of a sheet of paper. It is a further object to measure the continued resistance of the sheet to tearing,—after the initial tear has been effected. It is also an object to provide simple apparatus for testing and measuring the initial and subsequent tear resistance of paper. It is a further object to provide means for recording such measurements. Other objects will appear from the following description.

The operation of the invention embraces generally the steps of securing a test strip of paper at two areas, which are spaced apart along its straight free edge (and which are preferably semi-circular in shape, with their centers at the free edge) applying an increasing tensile stress to the paper between said centers and hence along the marginal edge therebetween until initial tearing takes place and thereafter separating the centers and/or torn edges by causing or permitting the secured areas to rotate about said centers at a substantially uniform rate, while measuring the tensile stresses applied throughout the operation.

It may be pointed out that if the secured areas are of considerable size and are not free to rotate (or caused to rotate) upon and after the initial tear is effected at the edge of the paper strip, the force with which the areas are separated may be transmitted across the entire width of the strip between said areas and rupture will not occur until the ultimate tensile strength of the strip has been exceeded. This would be substantially equivalent, therefore, to the tensile strength tests heretofore employed between separated clamps. On the other hand, the areas of the paper need not necessarily be of large area nor semi-circular in shape, although a circular shape is desirable inasmuch as its margin transmits a uniform leverage of the force applied across the sheet (after commencement of the tear) along the line of centers which are being separated.

A typical application of the invention will be described with reference to the apparatus, as shown in the accompanying drawings in which:

Fig. 5 is a detail cross section along 5—5 of Fig. 1;

Fig. 6 is a cross section along line 6—6 of Fig. 1;

Fig. 7 is an end elevation of the apparatus as in Fig. 1;

Fig. 8 is a front elevation of a modification of the securing discs as shown in Fig. 1; and Fig. 9 is a front elevation of a further modification of the discs as shown in Fig. 1.

Figure 2:
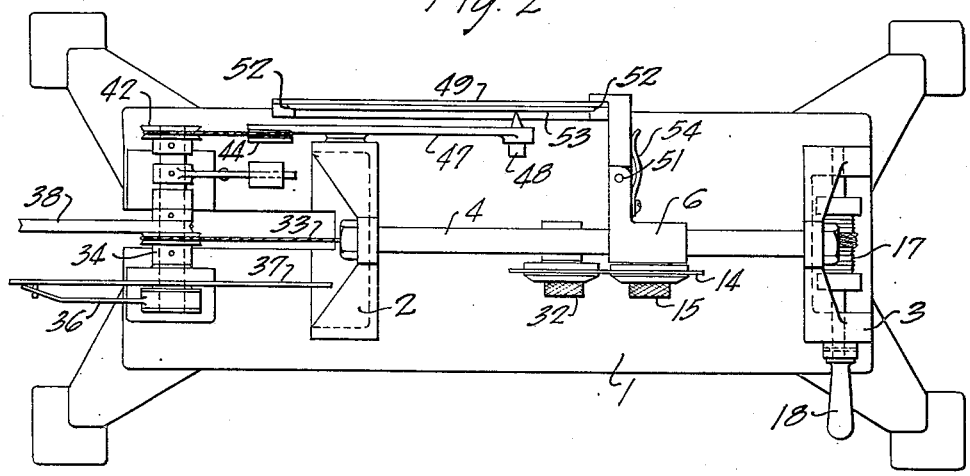
Fig. 2 is a plan view of the same.
Figure 1:
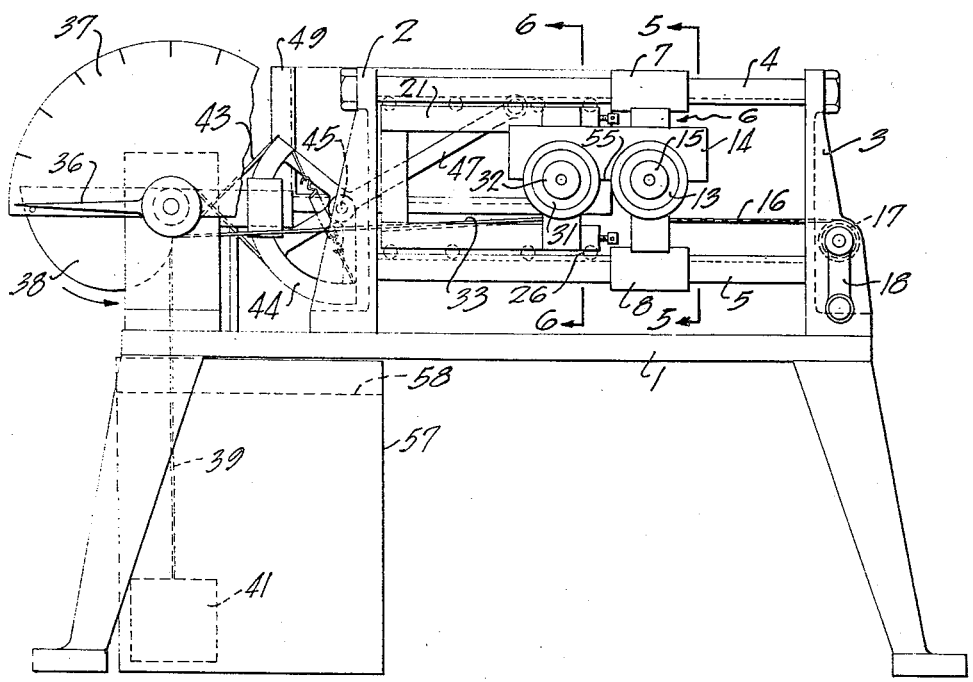
Fig. 1 is a front elevation of the apparatus, with a test sheet in position to be tested.

Referring to Fig. 1, the apparatus comprises a suitable base 1 having spaced uprights 2, 3, which support between them two superposed parallel guide rods 4, 5. Between these rods and adjacent to the upright 3 is provided a carriage 6 having sleeves 7, 8, which slidably engage the rods 4, 5, respectively. The carriage 6 also is provided with a transverse axis 9 carrying a pulley 11 fixed thereon and also two discs 12, 13, both of which are non-rotatably fixed thereon. Disc 13, however, is longitudinally slidable along the axis 9, as by having a flattened portion of the latter to pass through and engage a similar hole in the disc. Between discs 12 and 13 the axis is slotted as shown at 10 in Fig. 5 to permit a test strip of paper (14) to seat therein with its lower edge coincident with the center of the axis, as in Fig. 1. The outer end of the axis 9 carries a knurled nut 15, screw threaded to the axis, whereby the disc 13 may be tightened against the disc 12 or the test sheet 14.

A flexible belt or cord 16 is attached to the periphery of pulley 11 and thence passes over a mandrel 17 mounted upon the upright 3, which may be turned by hand crank 18 or other means, preferably to provide a slow and constant speed of rotation.

Between guide rods 4, 5, and to the left of the carriage 6 is mounted a rectangular carriage or frame 21 having grooved ball races 22, 23 in its lower and upper edges corresponding to similar grooves 24, 25, in the rods 4, 5, respectively, to receive therebetween ball bearings 26 and thus to permit the frame to roll smoothly and practically without resistance, back and forth along the supporting rods 4, 5. The frame or carriage 21 is also provided with an axis 27 having a pulley 28, fixed thereon, a fixed disc 29, a slidable disc 31, a slot 30 in the axis between discs 29 and 31 and a knurled nut 32, for tightening the discs together, similar to the carriage 6.

Preferably nuts 15 and 32 have opposed threads, so that the strip of paper 14, secured therebetween will not tend to loosen them, under stress.

To the periphery of pulley 28 is attached a cord or belt 33 which passes to a similar pulley 34 on a rotatably mounted axis 35 (Fig. 7). The latter is provided (at its front end) with a friction-positioned pointer 36, frictionally and firmly engaging the axis 35, but not fixed thereto, so as to swing over a fixed circular scale 37, a cam 38, described in greater detail hereinafter, a cord 39, concentrically suspended from and engaging the periphery of cam 38 and carrying weight 41, and a supplementary pulley 42, fixed to the axis 35 and connected by a belt or cord 43 to a pulley 44 which is rotatably mounted and carries a pointer arm 47.

The cam 38 is convolute in shape, and so proportioned that upon being revolved in a counter-clockwise direction a given angular amount from the position shown in Fig. 1, the cord 39 carrying the weight 41 will be suspended (from the periphery of the cam) at a unitary distance from the center of the axis; and so that a second equal amount of angular rotation of the cam will produce an equal increment in the radial distance of the point of suspension of the weight 41 from the center of shaft 35; and so on, throughout 180° or, the cam surface may be extended, if desired, to operate through more than 180° of rotatory movement of the axis 35.

The pulley 44 is pivotally mounted at 45 and is provided peripherally with an arcuate groove 46 which the belt or cord 43 engages, and with an arm 47 (suitably proportioned in length, with respect to the radius of the arcuate surface 46) upon the extremity of which is mounted a pencil point 48.

Mounted upon the rear part of the carriage 6 is a plate 49 pivoted at 51 and having channels 52, adapted to receive a card or ruled chart 53. The plate 49 may be swung against the pencil point 48, and held thereagainst by tension spring 54 or by the resiliency of the pencil point mounting sufficiently to effect marking contact of the latter.

In operation, the carriages 6 and 21 are positioned substantially midway between the uprights 2, 3. Discs 13 and 31 are loosened by turning the nuts 15 and 32 outwardly. The strip of paper 14, to be tested, is dropped into the space between discs 12 and 13 and between discs 29, 31 respectively until its lower edge 55 rests in the slots 10 and 30. The edge 55 thus lies directly upon the line of centers of the discs 13 and 31. Nuts 15 and 32 are then tightened, forcing discs 13 and 31 against the paper and holding it firmly against discs 12 and 29, respectively.

The pointer 36 is returned to zero position and the cam 38, if not already in the position indicated in Fig. 1 (which it tends to assume, under impulse of weight 41) is returned to such position. At this point, it will be observed, the weight 41 is suspended from the center of shaft 35 and hence exerts no torque thereon.

The indicator arm 47 may be adjusted to any desired position with respect to the chart 53, by slippage of the cord 43 over the arcuate surface in channel 46, but will retain such position after adjustment, due to friction.

The hand crank 38 is now slowly but steadily rotated, first to take up any slack in the cords 16 and 33. Thereafter, the cord 16, acting upon pulley 11, draws the carriage 6 to the right along rods 4, 5, which in turn draws the carriage 21 after it,—the force being transmitted primarily along the line of centers between the discs 12 and 29 and hence along the margin 55 of the paper sheet 14. The carriage 21 moves freely and substantially without resistance, while the forward tension of the sheet is transmitted by pulley 28 to cord 33 and thence to pulley 34 which, being fixed on shaft 35 causes the latter to rotate in the direction of the arrow (Fig. 1) by a force substantially equal to the force applied to the paper margin 55.

Upon rotation of cam 38, the cord 39 is taken up, at a constant rate and the weight 41 is suspended at a correspondingly increased distance from the center of rotation of axis 35. Such increase in the radius correspondingly increases the leverage of the weight 41 and hence the tension across the edge of the paper 55.

The rotation of axis 35 turns pulley 42 and through belt 43 moves the indicator point or pencil 48 downward, thus tracing a downward path upon the chart 53 which, being attached to the carriage 6, moves uniformly to the right. The composite movement traces a graph 56 upon the chart 53.

Figure 3:
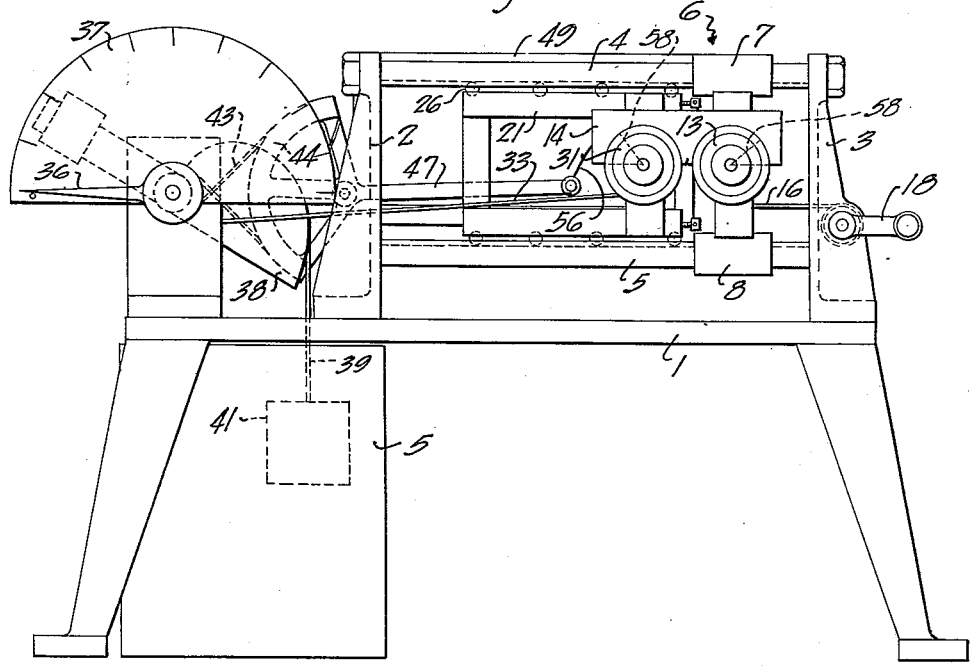
Fig. 3 is a front elevation, similar to Fig. 1, showing the moving parts and recording mechanism in position at the instant of initial rupture.
Figure 4:
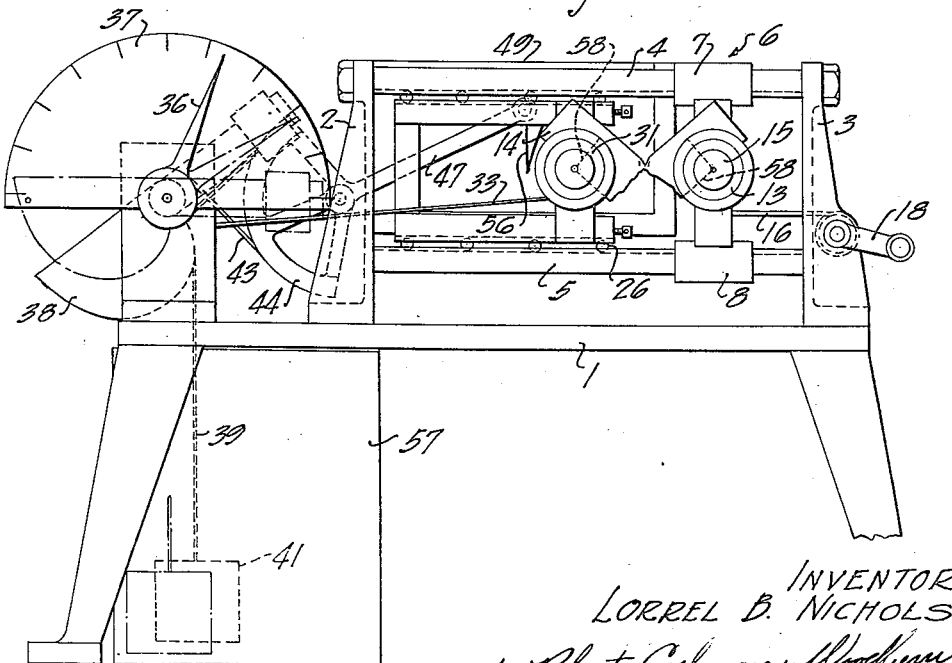
Fig. 4 is a front elevation, similar to Fig. 3, showing the position of parts after the test sheet has commenced to tear.

When the paper first tears (Fig. 3) the cam 38 reaches its maximum position, and, due to the fact that the torn sheet will continue to tear at a lower tension, the weight 41 is released (Fig. 4) and falls until the leverage on axis 35 is sufficient to create this tension. At the same time, the indicator or marker 48 moves upwardly abruptly. The pointer 36 (which is theretofore prevented from moving downwardly by the pin 36') moves upwardly a corresponding distance upon scale 37 which thus indicates the difference between the initial tearing strength of the paper and the tearing strength.

At the same time, the torque upon the pulleys 11 and 28, causes the discs 13 and 31 to turn toward each other as the paper tears so that the point of tearing is constantly maintained upon their line of centers.

When the strip is torn completely across, the weight 41 falls to its original position, (Fig. 1) cam 38 returns to its corresponding position, pointer 36 moves upwardly still further upon scale 37 thus indicating the maximum angular movement of the shaft 35 and hence, by suitable calibration, the number of pounds (or other units) of tension to which the edge of the strip was subjected at the moment of initial tear.

Likewise, the pointer 48 moves upward to its original horizontal level upon the chart 53 which thus indicates in graphic form the tensile strength at the point of initial rupture and also the tearing strength throughout the remaining cross section of the sheet.

In the testing of papers which are especially strong in their initial resistance to tearing and in which there is a consequently rapid release of the weight 41 with an attendant back lash to the indicator point 48, it may be advisable to provide a dash pot 57 filled with a liquid 58 in which the weight 41 is submerged to dampen such rapid movements and permit it to return more slowly to its true position.

While the description and illustration of the apparatus given above relates to preferred means for securing semi-circular areas of the test sheet of paper, it is to be understood that the shapes and sizes of such secured areas and the rotation of the same may be varied as shown in Fig. 9. For example, the securing means may be attached at spaced points along the edge of the sheet and be rotated or permitted to rotate about points not lying upon the edge of the sheet. Thus the sheet 14' (as shown in Fig. 8) might be allowed to drop between discs 13' and 12 (not shown) and between discs 31' and 29 (not shown) until its lower edge becomes tangent to the lower edges of the discs and retained therein by tightening the nuts 15 and 32, and the apparatus then operated as before, the discs rotating about the same centers as before but the margin of the paper no longer connecting their line of centers but tangent to their peripheries. Likewise sectors of the disc might also be removed which are not necessary to adequate retention of the sheet, as indicated by dotted lines 58 in Figs. 3 and 4 and as illustrated by the sectors 58' in Fig. 9. If the sheet were secured in the thus reduced areas only and the securing means then forcibly separated as before (either with or without rotation) the initial tearing stress would be directly applied, without introducing any torque.

Again, it is to be observed that in any case, instead of being attached to the peripheries of the pulleys 11 and 28, cord 16 and/or cord 33 may be attached to the centers of their respective pulleys or directly to the carriages 6 and 21, respectively, thus leaving the discs free to turn when the paper tears, but not subjecting the pulleys to any initial torque as illustrated in Fig. 8 of the drawings.

While the invention has been described in its application to the determination of the tear strength of paper, it will be understood that the tear strength of other materials having analogous properties and characteristics may be similarly tested and that the apparatus may be adjusted or arranged accordingly.

It should also be understood that the present disclosure is for the purpose of illustration only and that this invention includes all modifications and equivalents which fall within the scope of the appended claims.

I claim:

1. Apparatus for testing the tearing strength of paper, comprising means for securing the paper to be tested at spaced points along the margin of the sheet and means for applying thereto an increasing tensile stress, tending to separate the same, said securing means being freely rotatable.

2. Apparatus for testing the tearing strength of paper, comprising means for securing the paper to be tested at two spaced areas, including points in the margin of the sheet, one of said securing means being rotatably mounted, in the plane of the sheet, and means for subjecting said securing means to an increasing torque.

3. Apparatus for testing the tearing strength of paper, comprising means for securing the paper to be tested at two spaced areas, including points in the margin of the sheet, said securing means being rotatably mounted and independently movable in the plane of the sheet, and means for subjecting said securing means to an increasing torque, in opposite directions.

4. Apparatus for testing the tearing strength of paper, comprising means for securing the paper to be tested at two spaced areas, including points in the margin of the sheet, said securing means being rotatably mounted and independently movable in the plane of the sheet, and means for subjecting said securing means to a constantly increasing stress, tending to separate the securing means, in opposite directions.

5. Apparatus for testing the tearing strength of paper, comprising means for securing the paper to be tested at two spaced areas, including points in the margin of the sheet, said securing means being rotatably mounted and independently movable in the plane of the sheet, and means for subjecting said securing means to a constantly increasing stress, tending to rotate and separate the securing means, in opposite directions.

6. Apparatus for testing the tearing strength of paper, comprising means for securing the paper to be tested at two spaced areas, including the margin of the sheet, said means being rotatably mounted and independently movable in the plane of rotation, means for subjecting said securing means to stress tending to separate the same, and means for measuring said stress.

7. Apparatus for testing the tearing strength of paper, comprising means for securing the paper to be tested at two spaced areas, including the margin of the sheet, said means being rotatably mounted and independently movable in the plane of rotation, means for subjecting said securing means to stress tending to separate the same, and means for measuring and recording said stress.

8. Apparatus for testing the tearing strength of paper, comprising means for securing the paper to be tested at two spaced areas on the margin of the sheet, each of said securing means being mounted for rotation about a point in the margin of the paper as a center, means for subjecting said securing means to a stress tending to separate the same and means for measuring the amount of said stress.

9. Apparatus for testing the tearing strength of paper, comprising means for securing the paper to be tested at two spaced areas on the margin of the sheet, each of said means being mounted for rotation about a point in the margin of the paper as a center, means for subjecting said securing means to a stress tending to separate and to rotate the same severally in opposite directions about said centers, and means for continuously measuring the amount of said stress.

10. Apparatus for testing the tearing strength of paper, comprising means for securing the paper to be tested at two spaced areas on the margin of the sheet, each of said means being mounted for rotation about a point in the margin of the paper as a center, means for subjecting said securing means to a stress tending to separate the same and to rotate the same in opposite directions, and means for measuring and recording the amount of said stress.

11. Apparatus for testing the tearing strength of paper, comprising means for securing the paper to be tested at two spaced areas on the margin of the sheet, said securing means being severally mounted for rotation about points in the margin of the paper as centers, means for subjecting said securing means to increasing stress tending to separate and to rotate the same in opposite directions, up to the initial tearing strength and equal to the tearing strength thereafter, and means for continuously measuring the amount of said stress.

LORREL B. NICHOLS.